United States Patent [19]
Anderson

[11] 4,023,623
[45] May 17, 1977

[54] CULTURAL IMPLEMENT WITH FOLDABLE TOOL SUPPORTING FRAME

[75] Inventor: Charles W. Anderson, Kewanee, Ill.

[73] Assignee: Chromalloy American Corporation, St. Louis, Mo.

[22] Filed: Jan. 26, 1976

[21] Appl. No.: 652,490

[52] U.S. Cl. .................................. 172/311; 74/105; 172/456
[51] Int. Cl.² ........................................ A01B 63/32
[58] Field of Search .......... 172/126, 130, 131, 132, 172/231, 311, 456, 459, 491, 640, 662; 280/39, 411 R, 411 A, 413, 639, 651; 254/86 H, 124; 74/99 R, 101, 102, 103, 105; 214/130 R; 56/6, 7, 228, 385

[56] References Cited
UNITED STATES PATENTS

| | | | |
|---|---|---|---|
| 2,581,662 | 1/1952 | Hutchinson | 254/124 X |
| 2,793,767 | 5/1957 | Smith et al. | 254/124 UX |
| 3,222,032 | 12/1965 | Schneider | 254/124 |
| 3,564,934 | 2/1971 | McMurtry | 74/105 |
| 3,667,631 | 6/1972 | Bishop | 254/124 X |
| 3,736,735 | 6/1973 | Kulak et al. | 56/6 X |
| 3,828,860 | 8/1974 | Poland | 172/311 |
| 3,941,194 | 3/1976 | Orthman | 172/456 X |
| 3,944,001 | 3/1976 | Warner et al. | 172/311 |
| 3,948,326 | 4/1976 | Harbert | 172/130 |

FOREIGN PATENTS OR APPLICATIONS 747,719 4/1956 United Kingdom .............. 254/124

OTHER PUBLICATIONS

"Mississippi Mulcher – Model PMR..III" Poplarville Manufacturing Co., Poplarville, Mississippi, Publ. date appears to be 1975.

Primary Examiner—Richard T. Stouffer
Attorney, Agent, or Firm—Johnson, Dienner, Emrich & Wagner

[57] ABSTRACT

An agricultural implement has a hinged winged frame which swings between a horizontal storage position over the main frame and an outboard generally horizontal work position. A hydraulic cylinder pivoted to the implement main frame has its piston pivotally connected to the upper end of an operating link which pivotally connects at its opposite end to a link made rigid with the wing frame and which swings on the hinge axis. An abutment block on one of the links engages the other link to solidify the pivotal connection of the links converting the two links into a first class lever fulcrumed on the hinge axis as the piston is retracted within the cylinder to raise the wing frame out of its working position. The abutment block is carried out of engagement with the other link as the pivotal connection of the links approaches the axis of the cylinder pull thereon; and a guideway catches and confines the pivotal connection to the operating link as the links move apart to interrupt the solidified connection, said guideway supporting the load of the wing frame as the piston further retracts to lower the wing frame to its horizontal storage position over the main frame.

20 Claims, 10 Drawing Figures

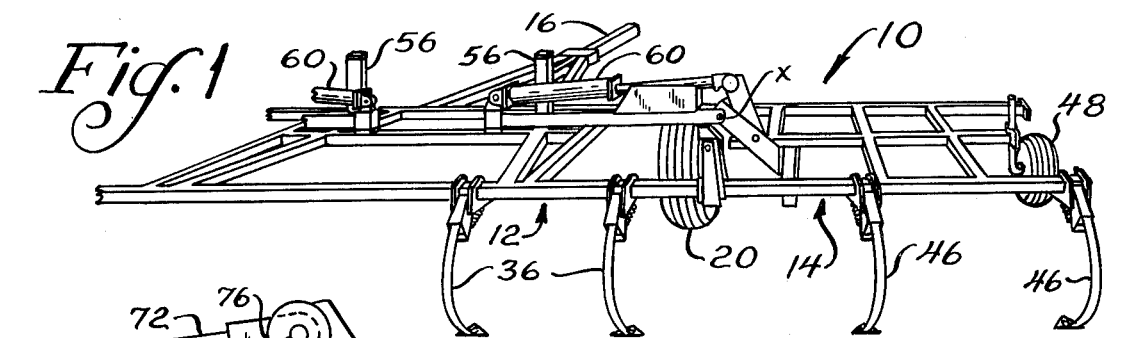
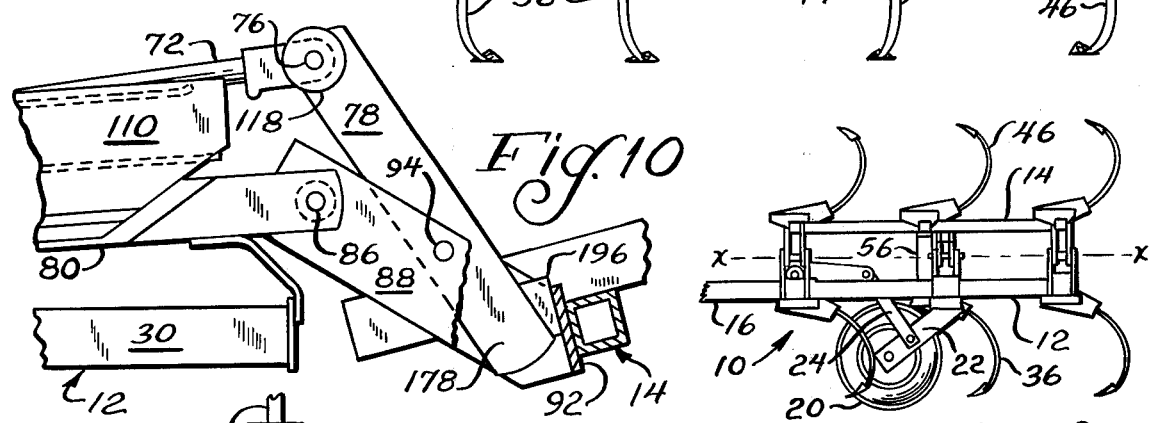
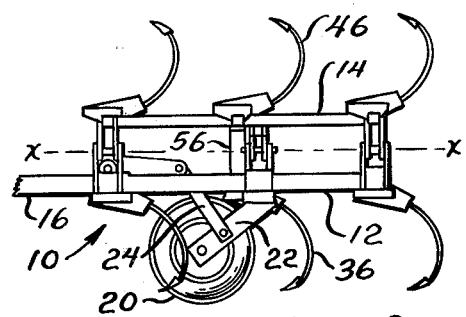
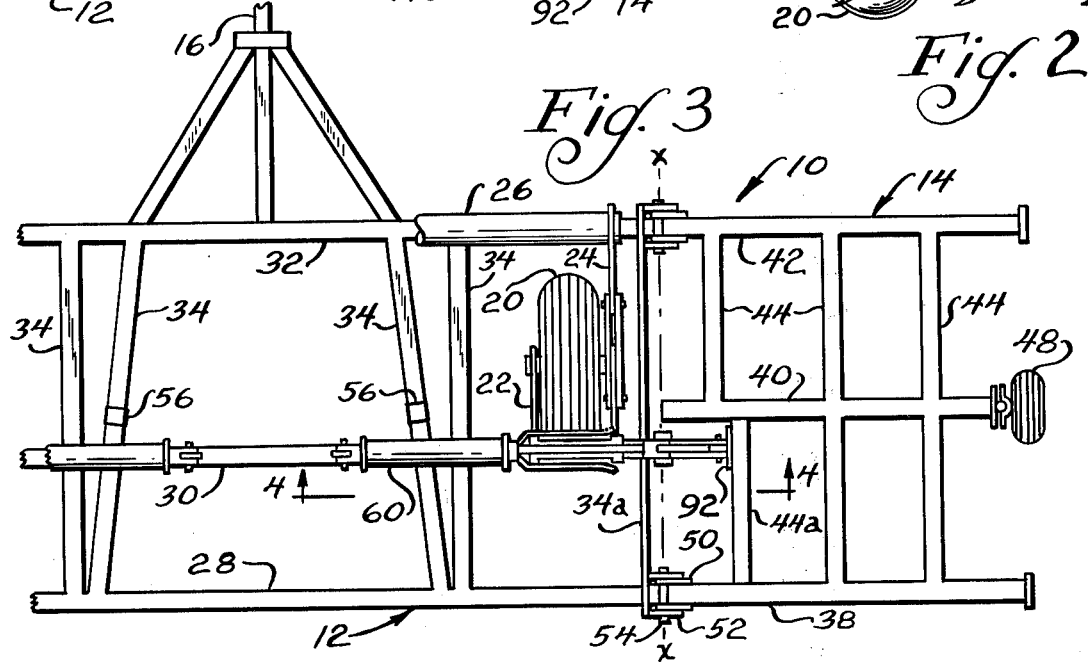
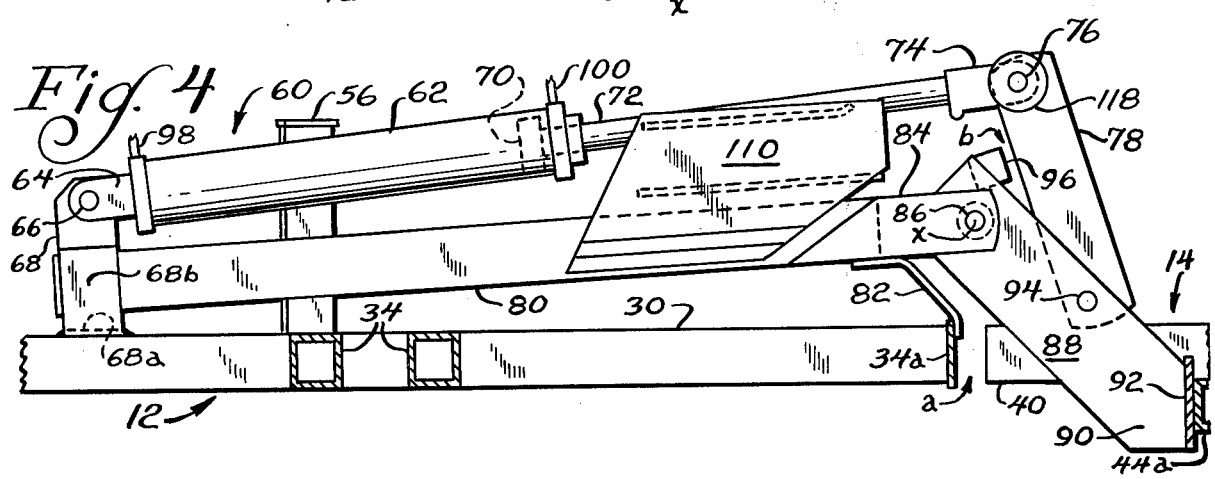

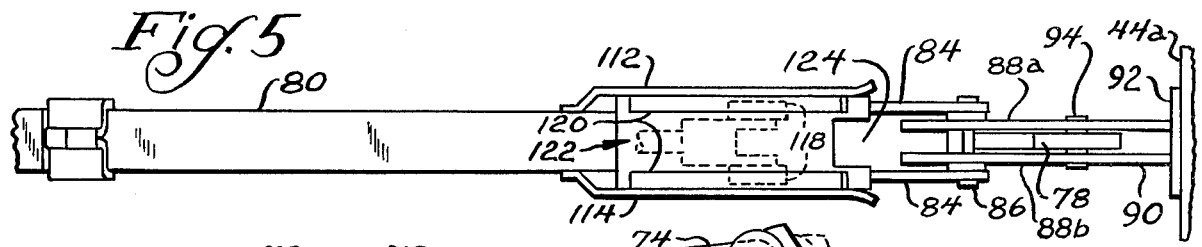
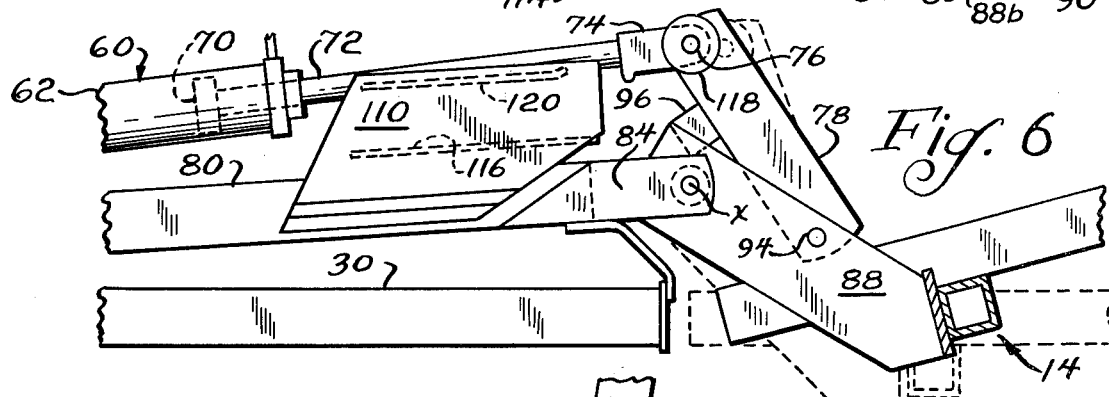
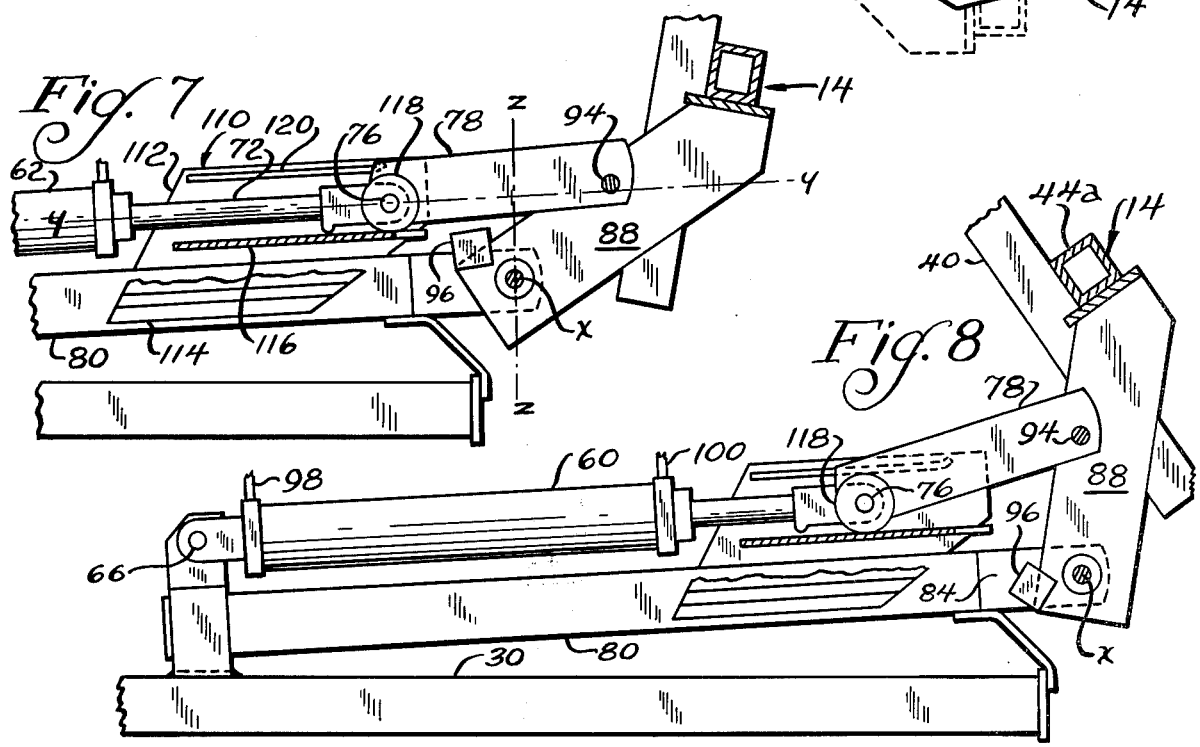
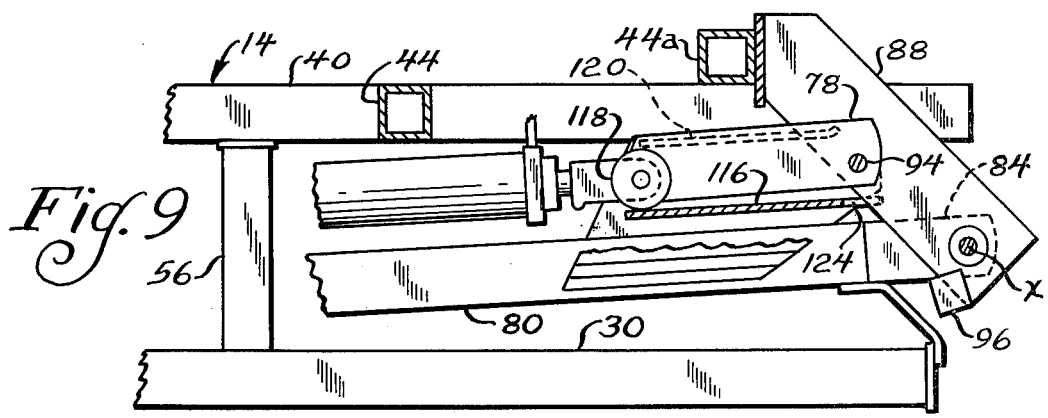

CULTURAL IMPLEMENT WITH FOLDABLE TOOL SUPPORTING FRAME

This invention relates generally to agricultural implements such as field cultivators, mulchers, discs and harrows which are either self propelled or pulled behind a tractor to till the soil.

It more particularly relates to such implements having one or more tool supporting wing frames hingedly supported to a main tool supporting frame for greater tilling width, these wing frames being foldable over the main frame to reduce the implement width as when the implement is to be stored or moved from one location to another.

A principal object of the invention is to provide such implements with a remotely operated articulated linkage system of simplified construction which can be manufactured economically, will be of durable, rugged construction and will be effective to fold the wing frame (s) into a safe, stable generally horizontal inverted storage position at rest over the implement main frame and to unfold them to an outboard generally horizontal working position at the side or sides of the main frame, in which working position the wing frames are free to float so as to follow field contour and slope in use of the implement.

Prior to the invention, it was known to utilize an articulate linkage system driven by a hydraulic cylinder which could be remotely operated from the tractor cab to swing the tool supporting wing frame of such implement between its generally horizontal storage position over the main frame and its generally horizontal working position to one side of the main frame.

In R. L. Poland U.S. Pat. No. 3,828,860 issued to my assignee such a linkage system is disclosed as comprising an operating link pivotally connected at one end either directly to, or through a second link, to the piston of a hydraulic cylinder, the opposite end of the operating link being connected to the wing frame hinge element by a dual pivot pin and arcuate slot connection spaced outwardly from the hinge axis and on a lateral projection of the hinge lement at its end fixed to the wing frame. As disclosed in said patent, the hinge axis was located above the operated hydraulic cylinder and intermediate the horizontal storage and working positions of the wing frame such that in the storage position of the wing frame the operating link would be disposed outward of and parallel to a vertical including the horizontal hinge axis. The operating link also supports a pivot or fulcrum member which slides in a guideway through the major thrust of the cylinder to support the load of the wing frame as it is swung about the hinge axis, exiting therefrom only as the wing frames come to rest in its horizontal storage position over the main frame. The dual pin and slot connection permits a load shift from one pin to the other as the load of the wing frame passes center, thereby to shorten the stroke of the operating piston and permit the operating link to be located close to the side of the folding wing frames.

In accordance with this invention, the hydraulic cylinder is located above both the main frame and the hinge axis where it is less subject to the soil and trash turned up by the tools supported therebeneath in the tilling act. The cylinder piston pivotally connects to one end of an operating link which is pivotally connected to the mid section of a hinge link made rigid at one end to the wing frame and at its other end swinging on the hinge axis.

A feature of the invention is that in the working position of the wing frame outboard of the main frame, the pivotal connections of the operating link to the cylinder piston and the hinge link are uninhibited and the wing frame is free to swing on the hinge axis to follow the field contour and slope.

A further feature of the invention is the provision of locking means which are activated in response to pull of the hydraulic cylinder on the operating link to solidify the pivotal connection of the latter to the hinge link such that the two links function as a first class lever fulcrumed on the hinge axis and with continued retraction of its piston into the cylinder the wing frame is raised out of its working position.

In a preferred form of the invention such locking means comprises an abutment block fixed to the hinge link adjacent the hinge axis against which the pulling force of the cylinder piston is directed through the operating link.

A further feature of the invention is that means are also provided to relieve the locking means as the load of the wing frame is raised above the effective pull line of the cylinder piston loosening the pivotal connection of the two links and converting the system to a third class lever also fulcrumed on the hinge axis.

In the preferred embodiment of the invention, said relieving means comprises a guide way into which the pivotal connection of the operating lever to the cylinder piston enters as the pivotal connection of the links approaches the axis of the pull of the cylinder piston thereon. With continued retraction of the piston into the cylinder and upward swing of the wing frame on the hinge axis, the abutment of the hinge link moves away from the operating link so that the pull of the piston is now directed against the pivotal connection of the operating link to the hinge link. With continued retraction of the piston cylinder, the load of the wing frames passes center and is lowered to its storage position on the main frame.

On the reverse stroke of the piston to raise the wing frame out of said storage position and lower it to its outboard working position, the guideway confines the pivotal connection of the piston to the operating link until the operating link reengages the abutment on the hinge link reconverting the linkage to a first class lever. As this occurs, said pivotal connection of the piston moves out of the guideway and with its continued extension from the cylinder the wing frame is lowered to its working position.

A feature of the invention is that in lowering the wing frame to its storage position on the main frame and also raising it therefrom, the weight of the wing frame is supported on the guideway.

A further feature of the invention is that both the linkage system and the cylinder which operates it are located above the main frame where they are protected from the soil and trash collected by the tools in the tilling function.

A companion feature thereto is that the linkage system and the means which convert it between third and first class levers afford a relative short piston stroke and a compact operating area so that both the hinge axis and the storage position of the wing frame can be located close to the main frame.

A further feature of the invention is that in the full swing of the wing frame on the hinge axis between its storage and working positions, the piston retains control over the wing frame. There is no free fall or pins moving in slotted holes as the wing frame pass center.

Another feature of the invention is that the elements of the linkage system remain inboard of the wing frame to further minimize the implement width in its folded condition.

Other objects, advantages and features will be apparent or will become so upon consideration of the disclosure of a preferred embodiment of the invention which follows.

Referring therefore now to the drawings:

FIG. 1 illustrates the invention embodied in an agricultural implement such as a field cultivator, the wing frames being in their outboard working position;

FIG. 2 is a side view of the implement shown with a wing frame folded to its storage position;

FIG. 3 is a top plan view of the implement shown in FIG. 1;

FIG. 4 is a rear elevational view of the operating cylinder and the articulate linkage system which connects it to the wing frame, the view being taken generally along lines 4—4 of FIG. 3, the wing frame being fragmented and shown in its outboard generally horizontal working position;

FIG. 5 is a top plan view of the cylinder and linkage shown in FIG. 4;

FIG. 6 is a view generally similar to FIG. 4 but further fragmented and shows the operating link locked to the hinge link and the wing frame partially raised out of its working position;

FIG. 7 is a view similar to FIG. 6 and shows the wing frame raised to a height where the piston connected end of the operating link has entered the guideway and the locked condition of the links has been relieved;

FIG. 8 illustrates the operating link further retracted into the guideway and the weight of the wing frame supported thereby as it is lowered to its storage position on the main frame with further retraction of the piston;

FIG. 9 illustrates the linkage arrangement and guideway with the wing frame in its storage position, and FIG. 10 illustrates a modification of the invention.

Referring now more particularly to the several views, the invention is illustrated as embodied in an agricultural implement of otherwise conventional construction, such as a field cultivator, harrow, chisel plow, mulcher or other soil tilling device. As illustrated by FIGS. 1–3 one such implement commonly referred to as a field cultivator is identified generally as 10 and comprises a tool supporting main frame 12 having a pair of tool supporting wing frames 14 hinged to opposed sides of the main frame to swing on parallel spaced horizontal hinge axes, only one of which wing frames and its hinge axis x—x are illustrated. It will be understood, however, that both wing frames are similarly constructed, and both are supported and operated as hereinafter particularly described with reference to the wing frame illustrated. Alternatively, such an implement 10 may have a single wing frame hinged to one side of the main frame.

As is conventional, main frame 12 is provided with a hitch bar or tongue 16 by which it is removably attached to behind a tractor not shown and is supported on a pair of laterally spaced rubber-tired transport wheels 20 only one of which is illustrated. Said wheels 20 are shown rotatively supported to swingable arms 22 which are connected through suitable linkage 24 to a rocking tube construction 26 supported on the main frame and operated through conventional means such as a crank or hydraulic cylinder(not shown)to effect raising and lowering of the wheels 20 and thereby main frame 12 between its illustrated transport position (FIG. 2) where its tools are supported above ground level and one or more soil tillage gauging positions as when working in the field (FIG. 1).

As illustrated best in FIG. 3, main frame 12 comprises rear, intermediate and forward transverse frame members 28, 30, 32 secured in fixed parallel spaced relation by spaced longitudinally extending frame members 34. Said transverse and longitudinally extending frame members may be of tubular or other cross sectional configuration having sufficient structural strength and are welded or otherwise united into a generally rectangular-shaped rigid unitary form, the transverse members providing support for appropriate tilling tools such as the illustrated shanks 36. Preferably, a cap plate 34a is welded to the ends of the transverse member 28, 30, 32 along the two sides of the frame member.

Each said wing frame 14 also comprises rear, intermediate and forward transverse frame members 38, 40, 42 secured in fixed parallel spaced relation by spaced longitudinal extending frame members 44. These transverse and longitudinal extending members are also of similar hollow tubular construction and welded into a generally rectangular-shaped rigid form. Its transverse members similarly provide support for additional shanks or other soil tillage tools 46. Each said wing frames 14 is also supported on a vertically adjustable soil depth gaging wheel 48. Each said wing frame 14 and main frame 12 have upstanding rigidly connected hinge ears 50, 52 pivotally connected by aligned hinge pins 54 which define horizontal hinge axis x—x.

In the presently preferred form of the invention, the transverse frame members of the wing frames 14 and main frame 12 lie generally in the same horizontal plane when in their working position (FIG. 1) and hinge pins 54 are so located that hinge axis x—x is equidistantly spaced from the facing sides of ends of the aligned rear and forward transverse members of said wing and main frames. Also, in said preferred embodiment, said facing sides, or ends of the forward and rear transverse members, of the main and wing frames do not abut when said frames are in their aligned horizontal relation but are spaced a small distance apart as indicated at a in FIG. 4, hinge axis x—x being spaced outboard of the ends of the main frame transverse members 32, 28 and substantially over the facing side, or ends of the wing frame transverse members 42,38. Clearance space a accommodates the wing frame on the hinge axis x—x to follow soil contour and shape. Main frame 12 is also provided with appropriate located upstanding rest members 56 which extend above the wing frame operating mechanism as afterwards described and on which the wing frames may be rested when swung 180° from their generally horizontal work positions about hinge axis x—x to their generally horizontal storage position over the main frame as illustrated in FIG. 2.

In accordance with this invention, the tool supporting wing frames 14 are swung between their respective storage positions (FIG. 2) and their outboard working positions (FIG. 1) in response to forces exerted thereon through the extension and retraction of push pull means 60 which are pivotally connected at one end to the main frame 12 inboard of hinge axis x—x and at their opposite end to a respective wing frame 14 through a novel arrangement of linkage and associated pivotal connection confining means.

Push pull means 60 may be of conventional construction and operated either manually or through remotely controlled mechanical, hydraulic or electrical means. For example, said push pull means 60 may comprise a ratchet, a screw jack or other mechanical device capable of being extended or retracted within itself to increase or decrease the separation of its two connected ends. Preferably, however, it comprises a double-acting hydraulic-operated piston and cylinder which may be remotely operated as from the cab of a tractor to which the implement 10 is hitched.

Referring therefore now to FIG. 4, push pull means 60 is illustrated as comprising a cylinder 62 having a clevis end 64 pivotally connected at 66 to an upstanding U-shaped bracket 68 having its bight portion 68a welded or otherwise rigidly fixed to the upper surface of intermediate transverse member 30 of the main frame 12 inboard of hinge axis $x—x$. Reciprocally operated within cylinder 62 is a piston 70 having its rod 72 extending outwardly of the opposed end of said piston cylinder 62, the free end 74 of said rod being pivotally connected at 76 to one end of an operating link 78. Supported beneath push pull means 60 and aligned therewith is an outwardly inclined support member 80 having its inward end rigidly fixed between legs 68b of bracket 68 as by weldments and having its forward end rigidly supported on a second bracket 82 which may be welded directly to the forward end of transverse member 30 but is preferably welded to the cap plate 34a which is illustrated in FIG. 3 as welded to the forward ends of the transverse frame members 28, 30, 32 of the main implement frame.

Welded or otherwise rigidly secured to the opposed surfaces of the inclined support member 80 and projecting forwardly thereof are a pair of spaced hinge ears 84 between which is pivotally connected one end of a hinge link 88 as by pivot pin 86, said pivot pin 86 coinciding with hinge axis $x—x$. The opposite end 90 of said hinge link 88 has a mounting plate 92 (FIGS. 2, 4 and 5) rigidly connected to an interior one of the longitudinal frame members 44a of the wing frame, said hinge link 88 being disposed at about a 45° angle and so that its rigid connection 92 to the wing frame is spaced a substantial distance outwardly of the hinge axis $x—x$. Also as illustrated in said FIG. 4 or working position of the wing frame, said pivot pins 76 and 94 are outboard of the hinge axis $x—x$ whereas the pivot pin 66 is inboard, pivot pin 76 being located above said horizontal axis and pivot pin 94 spaced there below. Thus in the fully extended condition of piston 70 as illustrated by FIG. 4 operating link 78 is spaced from and out of engagement with said abutment block 96; and wing frame is free to swing on hinge axis $x—x$ within a limited angle to follow changes in field contour and slope during the tilling operation.

And now referring also to FIGS. 6–9 when it is desired to raise the wing frame out of its working position (FIG. 4) and return it to its storage position (FIG. 9) over the main frame 12, piston 70 can be retracted within cylinder 62 as by pumping fluid out of the cylinder cavity through port 98 and reintroducing it to the cavity through port 100 on the opposite or outboard side of the piston 70. In response thereto as illustrated in FIG. 6 piston 70 and its rod 72 will start to retract within the cylinder 62. As this occurs operating link 78 is thereby pulled inwardly so as to engage abutment 96.

With further retraction of the piston into the cylinder, the pulling force thereof on the operating link 78 is transmitted through the abutment 96 to the hinge link 88, abutment 96 effectively solidifying the pivot connection 94 of the operating hinge links such that they are effectively locked together and constitute a single link which then reacts as a first class lever in its response to the pull of hydraulic cylinder 60, the load being represented by the wing frame which is fulcrumed on the hinge axis $x—x$ now located there between and the applied force of the hydraulic cylinder 60 at 76.

With continued retraction of the piston into the hydraulic cylinder a point is reached where the load represented by the wing frame 14 is raised to near vertical (FIG. 7) but still to the outboard side of the vertical center line $z—z$ which intersects the hinge axis $x—x$. As illustrated in FIG. 7 when this occurs pivot connection 76 of the operating wing to the piston rod 72 has been lowered enough to bring operating link 78 into axial alignment with the piston rod 72 with the result that the operating link 78 has separated from the abutment 96. The pull of the hydraulic cylinder now acts on hinge link 88 through pivotal connection 94 and operating link 78; and in this new condition the links are free to swing relative to each other at 94, link 88 now acting as a third class lever by reason that the applied force is located between the load represented by the wing frame and the fulcrum represented by the hinge axis $x—x$.

In accordance with the invention, means in the form of guideway 110 now come into play to receive and confine the pivotal connection 76 of piston rod 72 as lever 78 separates from the abutment 96 wherefor the hydraulic cylinder retains control of the wing frame as it swings about hinge axis $x—x$ and is lowered to the storage position illustrated by FIG. 9.

Comparing FIG. 7 with FIG. 5 such a guideway 110 is illustrated as comprising a pair of side plates 112 and 114, the lower portions of which are shown welded to the opposite side of the supporting member 80 and with its upper portions located intermediate hinge axis $x—x$ and hydraulic cylinder 62 to either side of axis $y—y$. Guideway 110 further includes a base plate 116 supported between said side plates and forming a slide between said side plates on which to receive a pair of spaced discs 118 rotatably supported on the ends of pivot pin 76 which pivotally connects piston rod 72 to the operating link 78. Side plates 112 and 114 further support a pair of parallel spaced top plates 120 which as illustrated are located at a height above base plate 116 equal to approximately the diameter of said disc 118. As illustrated in FIGS. 4–7 space 122 between said top plates 120 accommodates piston rod 72 as the same is extended and retracted from hydraulic cylinder 62.

As illustrated in FIG. 7, the outer end of base plate 116 projects forwardly of top plates 120 far enough to receive discs 118 as, or just before, abutment 96 separates from the said operating links 78, or just as operating links 78 axially aligns with the pulling force of the hydraulic cylinder illustrated at $y—y$. With continued retraction of piston 70 into the hydraulic cylinder, discs 118 roll along base plate 116 to the inboard end thereof, the pulling force of the hydraulic cylinder therefore remaining essentially parallel to the inclination of the support member 80. Guideway 110 and more particularly its base plate 116 serves to support the load of the wing frame as it moves past the vertical center line z—z (FIG. 8) and is lowered to its horizontal storage position onto rests 56 (FIG. 9).

In the lowering of the wing frame about hinge axis x—x to said storage position, and also raising of said wing frame out of said storage position, top plates 120 simultaneously cooperate with the side plates 112 and 114 and base plate 116 to retain said discs 118 and thereby pivotal connection 76 within the guideway to prevent displacement therefrom, clearance space 122 accommodating the operating link plates 78 as it follows pivotal connection 76 through the guideway 110.

As illustrated by FIG. 9 guideway 110 has sufficient length that in the fully retracted condition of the piston, discs 118 remain within the confines of the guideway. The length of the guideway is also sufficient that the operating link 78 may be fully received within the guideway.

As illustrated in FIG. 5, the width of space 122 between the top plates 120 is less than the separation of discs 118 and only slightly greater than the width of hinge link 88. Thus, in the storage position of the wing frame 14 illustrated in FIG. 9, operating link 78 is confined within the guideway of 110, and by projecting through space 122, cooperates with top plates 120 to resist lateral displacement of the wing frame 14 and resultant torsional strain on the hinge connections 54 and 86. To accommodate this full reception of the operating link 78 within the guideway 110 the outboard end of base plane 116 is preferably notched as at 124. Thus in its storage position, the wing frame is not only stably supported in a horizontal position on rest 56 and confined against lateral movement but as seen in FIG. 9 is also located substantially entirely inboard of hinge axis x—x. Actually all but a minor portion of the hinge link 88 is also located inboard of the hinge ears 84, 52 thus achieving a compact structure of minimum width for travel and storage as well.

To return the wing frame 14 to its outboard generally horizontal working position (FIG. 4) the hydraulic fluid in the cylinder 62 is pumped in the reverse direction so that it exits from port 100 and reenters through port 98 thereby forcing piston 70 and its rod 72 outwardly of the hydraulic cylinder. As piston rod 72 moves outwardly therefrom, its force is exerted through operating link on the hinge link 88, causing the wing frame to rise out of its horizontal position. As previously mentioned, top plates 120 confine rollers 118 within the guideway and resist raising of pivotal connection 76 off base plate 116 thereof as the load of the wing frame portion passes vertical center line z—z. Thus the pushing force of the hydraulic cylinder on its connection 76 to the operating link remain constant until the operating link 78 has been lowered sufficiently that it reengages abutment 96 on the hinge link 88 and the two links are relocked into the form of a first class lever as previously described. As the discs 118 free themselves of the guide means 110, operating link 78 is locked by abutment 96 to the hinge link 88, the force of the hydraulic cylinder 62 reacting against the gravital pull of the wing frame load thereon. The result is that the wing frame is lowered smoothly and remains under control of the hydraulic cylinder until the wing frame 14 aligns with the main frame outboard thereof. Extension of the piston 70 and its rod 72 however continues until piston rod has been fully extended at which point the operating link 78 has been moved away from abutment 96 providing a clearance space b. The wing frame 14 is now in its working position and free to swing on hinge axis x—x to follow field contour and slope in the tilling act as previously described.

As thus far described, abutment 96 in addition to acting as a spacer for the hinge plates 88a and 88b constitutes a locking means actuated by engagement of the operating link 78 therewith for solidifying the hinge and joperating links into a single lever of the first class type which is fulcrumed on the hinge axis x—x during a portion of the wing frame raising and lowering act.

In the thus far described embodiment of the invention, said abutment 96 is fixed to the hinge link 88 between said plates 88a and 88b to the side of the hinge link to the hinge frame 92. It will be appreciated however, that the abutment also can be located closer to and also to the opposite side of the hinge axis or pivot pin 86. It also could be affixed to the operating link rather than to the hinge link in which event the locking of the two links would be achieved in substantially the same manner. Preferably however, the abutment block 96 is located in the position illustrated by FIG. 4 so as to be as close as possible to pivotal connection 76 and remote from pivotal connection 94 when the two links are locked together.

FIG. 10 illustrates an alternate construction in which the operating link 78 includes a portion 178 which extends beyond its pivotal connection 94 to the hinge link 88 and provides support for an abutment 196 which engages a portion of the mounting plate 92 immediately adjacent to the wing frame under the force of the hydraulic cylinder in raising the wing frame about the hinge axis x—x from its working position. In other respects the operating function of the locking means represented by abutment 196 (FIG. 10) would be like that of the preferred embodiment utilizing abutment 96 and in the location illustrated by FIG. 4.

It will be further appreciated that other variations and/or arrangements of the linkage locking means and the guide means can be had all within the spirit of the invention as defined by the attending claims.

Thus from the aforesaid description of preferred embodiments of the invention it will be appreciated that all of the recited objects, advantages and features of the invention have been demonstrated as obtainable in a highly practical manner and in a structure particularly adapted to satisfy the needs and requirements of both the farm machinery user and the manufacturer thereof. The construction is simple but effective in its operation and at the same time provides regidity and strength as well as versatility in use as required.

Having described the invention, what is claimed is:

1. An agricultural implement comprising a tool supporting main frame and at least one tool supporting wing frame, a hinge link rigidly connected to the wing frame and hingedly connected to the main frame to swing on a hinge axis, an operating link pivotally connected to the hinge link, a piston cylinder disposed over the main frame and containing an extendible and retractable piston, one of said piston and cylinder being pivotally connected to the main frame inboard of said hinge axis and the other pivotally connected to the operating link, the wing frame being swingable on said hinge axis between a storage position over the main frame and generally horizontal working position to one side of the main frame in response to force exerted on the operating link by retraction and extension of the piston within the cylinder, one of said links having an abutment positioned to be engaged by the other link when force is exerted on the operating link by the piston to swing the wing frame between near vertical and its generally horizontal working position, said abutment being out of engagement with the other link when the piston is in its fully extended position so that the wing frame is free to swing through a limited angle about the hinge axis when in its working position in order to follow field contour and slope, and guide means on the main frame which receive and support the pivotal connection of the operating link to said other of the piston and cylinder when the wing frame is swung between said near vertical and storage position.

2. An agricultural implement as claimed in claim 1 wherein the operating link is pivotally connected to the hinge link intermediate the latter's rigid and hinged connections to the wing frame and main frame respectively.

3. An agricultural implement as claimed in claim 2 wherein the abutment is fixed to the hinge link with the hinged connection of the hinge link to the main frame disposed therebetween and the fixed connection thereof to the wing frame.

4. An agricultural implement as claimed in claim 2 wherein the abutment is disengaged with the operating link when the pivotal connection of the operating link to the other of the piston and cylinder is received by the guide means in the raising of the wing frame out of its working position.

5. An agricultural implement as claimed in claim 4 wherein the abutment reengages with the operating link when the pivotal connection of the operating link to the other of the piston and cylinder exits from the guide means in the lowering of the wing frame to its working position.

6. An agricultural implement as claimed in claim 1 wherein the abutment is so located on the one of said links that it is out of engagement with the other link when the pivotal connection of the operating link to said other of the piston and cylinder is received within the guide means.

7. An agricultural implement as claimed in claim 1 wherein the pivotal connection of the other of the piston and cylinder to the operating link enters the guide means as the pivotal connection of the links nears the axis of the force exerted by the retraction of the piston into its cylinder in raising the wing frame from its working position to its storage position.

8. An agricultural implement as claimed in claim 7 wherein the pivotal connection of the other of the piston and cylinder exits from the guide means as the pivotal connection of the links nears the axis of the force exerted by the extension of the piston from the cylinder in lowering the wing frame to its working position.

9. In an agricultural implement having a tool supporting main frame and a tool supporting wing frame hinged to one side of the main frame to swing on a horizontal hinge axis between a storage position over the main frame and a generally horizontal working position outboard of its main frame, the combination of a hinge link rigidly connected to said wing frame which swings on the hinge axis, an operating link having one end portion pivotally connected to the wing frame adjacent the rigid connection of the latter to the hinge link, and push pull means disposed over the main frame and pivotally connected at one end to said main frame inboard of the hinge axis and having its other end pivotally connected to the operating link, guide means in which the pivotal connection of the push pull means to the operating link is supported for straight line movement as the wing frame is swung into and out of its storage position in response to the force of the push pull means acting on the wing frame through the pivotal connections of the operating link to the push pull means and the wing frame, and locking means which solidify the pivotal connection of the operating link to the wing frame during the interval of the swing such that the wing frame is raised and lowered into its working position by said forces of the push pull means.

10. The combination of claim 9 wherein said one end of the operating link is connected to the wing frame through its pivotal connection to the hinge link.

11. The combination of claim 9 wherein the wing frame is free to swing on the hinge axis in its working position to follow field contour and slope.

12. In an agricultural implement having a tool supporting main frame and a tool supporting wing frame hinged to one side of the main frame for swinging on a horizontal hinge axis between a generally horizontal storage position over the main frame and a working position which extends generally horizontal outboard of said main frame, the improvement wherein a hinge link pivotally connected to the main frame to swing on said horizontal hinge axis is rigidly connected to the wing frame, and an operating link is provided having one end pivotally connected to said hinge link intermediate said hinge axis and its rigid connection to the wing frame, a hydraulic cylinder being pivotally connected to the main frame inboard of said hinge axis, said cylinder containing a reciprocatable piston having its outer end pivotally connected to the opposite end of the operating link, roller means being supported adjacent the pivotal connection of the piston to the operating link, the wing frame in its work position being free to swing on said hinge axis relative to the main frame, and locking means which solidify the pivotal connection of said two links in response to a force exerted by the piston on the operating link to convert the two links to a first class lever fulcrumed on the hinge axis to raise the wing frame out of its working position, and guide means on said main frame which receive said roller means as the wing frame is swung on said hinge axis through an angle sufficient to release the locking means and convert the links to a third class lever, said guide means serving to confine the force effecting axis of the piston as it further retracts into the hydraulic cylinder to lower the wing frame to its generally horizontal storage position over the main frame, said guide means supporting the weight of the wing frame as its load swings past center and is lowered to its storage position over the main frame.

13. An agricultural implement comprising a tool supporting main frame, a tool supporting wing frame hinged to one side of the main frame to swing on a horizontal hinge axis between a generally horizontal storage position over the main frame inboard of the hinge axis and a generally horizontal working position outboard of the main frame and said hinge axis, a hinge link rigidly connected at one end to the wing frame and hingedly connected at its other end to the main frame to swing on said hinge axis, an operating link pivotally connected to the hinge link intermediate said rigid and hinged connections of the hinge link, a cylinder disposed over the main frame and pivotally connected to the main frame inboard of said hinge axis, a piston extendable and retractable within said cylinder pivotally connected to the other end of the operating link, slide means supported by one of said piston and operating link adjacent their pivotal connection, guide means in which the slide means is supported for straight line movement as the piston is extended and retracted to exert a force through the operating link to swing the wing frame between its horizontal storage position and angular position near the top of its swing, said slide member being free of said guide means in the portion of the swing of the wing frame between its said angular position and its generally horizontal working position, and locking means which solidify the pivotal connection of the operating link to the hinge link through said portion of the swing between the angular and working positions of the wing frame.

14. The agricultural implement of claim 13 wherein the locking means accommodate limited swing of the wing frame about the hinge axis while in its working position to follow field contour and slope.

15. The agricultural implement of claim 13 wherein the locking means comprises an abutment on one of said links positioned to be engaged by the other link under the force of the piston exerted on the operating link to swing the wing frame between its working position and its angular position near the top of its swing.

16. The agricultural implement of claim 15 wherein the abutment is located on the hinge link and remote from its connection to the wing frame.

17. The agricultural implement of claim 16 wherein the operating link is spaced from the abutment when the wing frame is disposed in its generally horizontal working position, the wing frame being free to swing on the hinge axis to follow field contours and slope.

18. The agricultural implement of claim 13 wherein the guide means comprises an open-ended channel member having confining sides, top and bottom wall for the slide means, the top of the channel member being slotted lengthwise to accommodate raising of the piston and operating link therethrough in the swing of the wing frame while confining the slide means.

19. The agricultural implement of claim 18 wherein the outboard end of the channel bottom wall is slotted to receive the hinge link when the wing frame is lowered to its horizontal storage position over the main frame.

20. The agricultural implement of claim 13 wherein the main frame has rest means on which the wing frame rests when swung into its horizontal storage position, and the guide means has catch means to receive the hinge link and resist horizontal movement of the wing frame when rested on said rest means.

* * * * *